May 25, 1926. 1,586,453
O. L. McCONNELL
LOCOMOTIVE BOOSTER MOTOR CONTROL
Filed Sept. 18, 1924 2 Sheets-Sheet 1
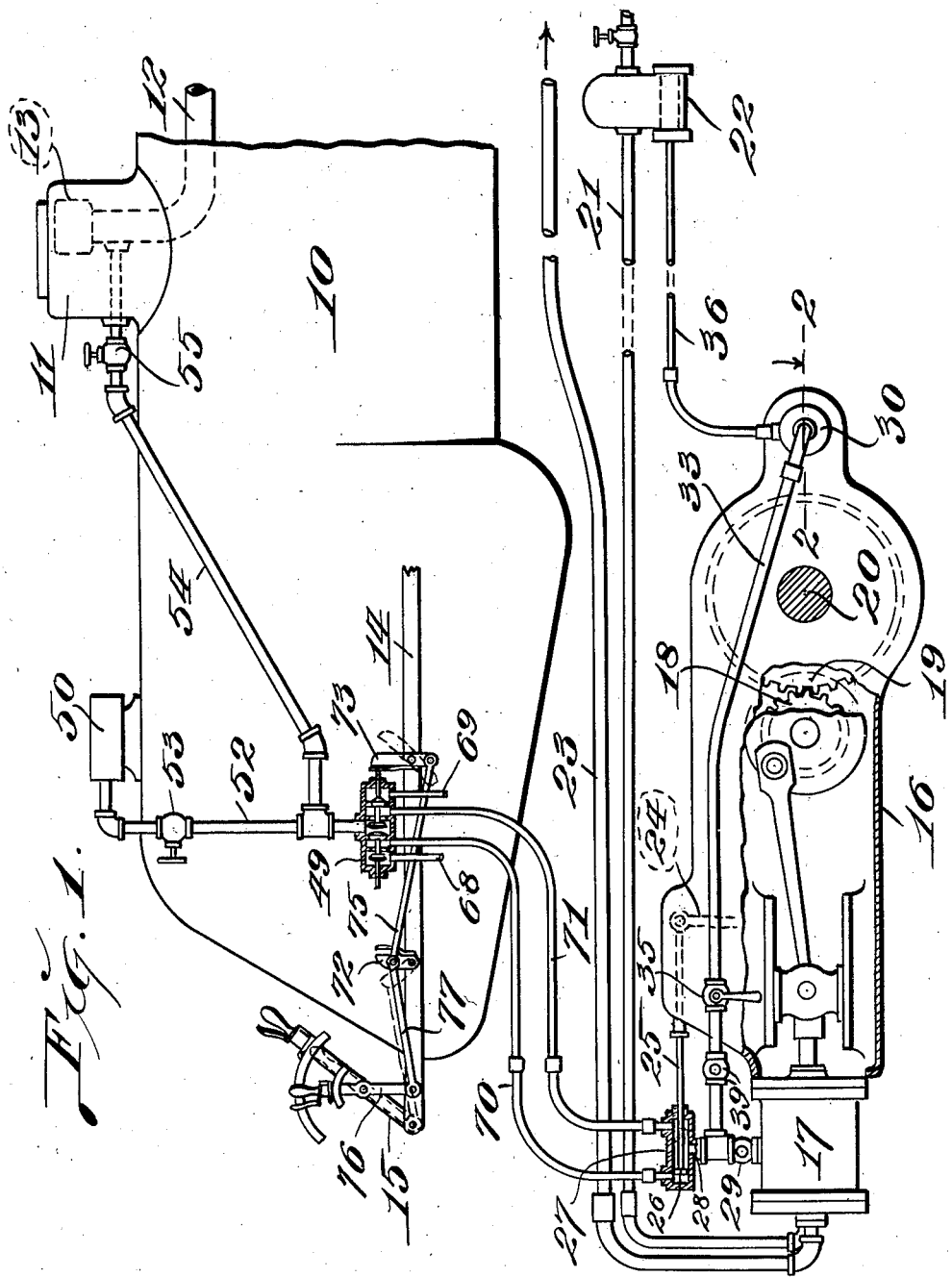
Inventor:—
Otis L. McConnell.
By Martin C. Smith, atty.

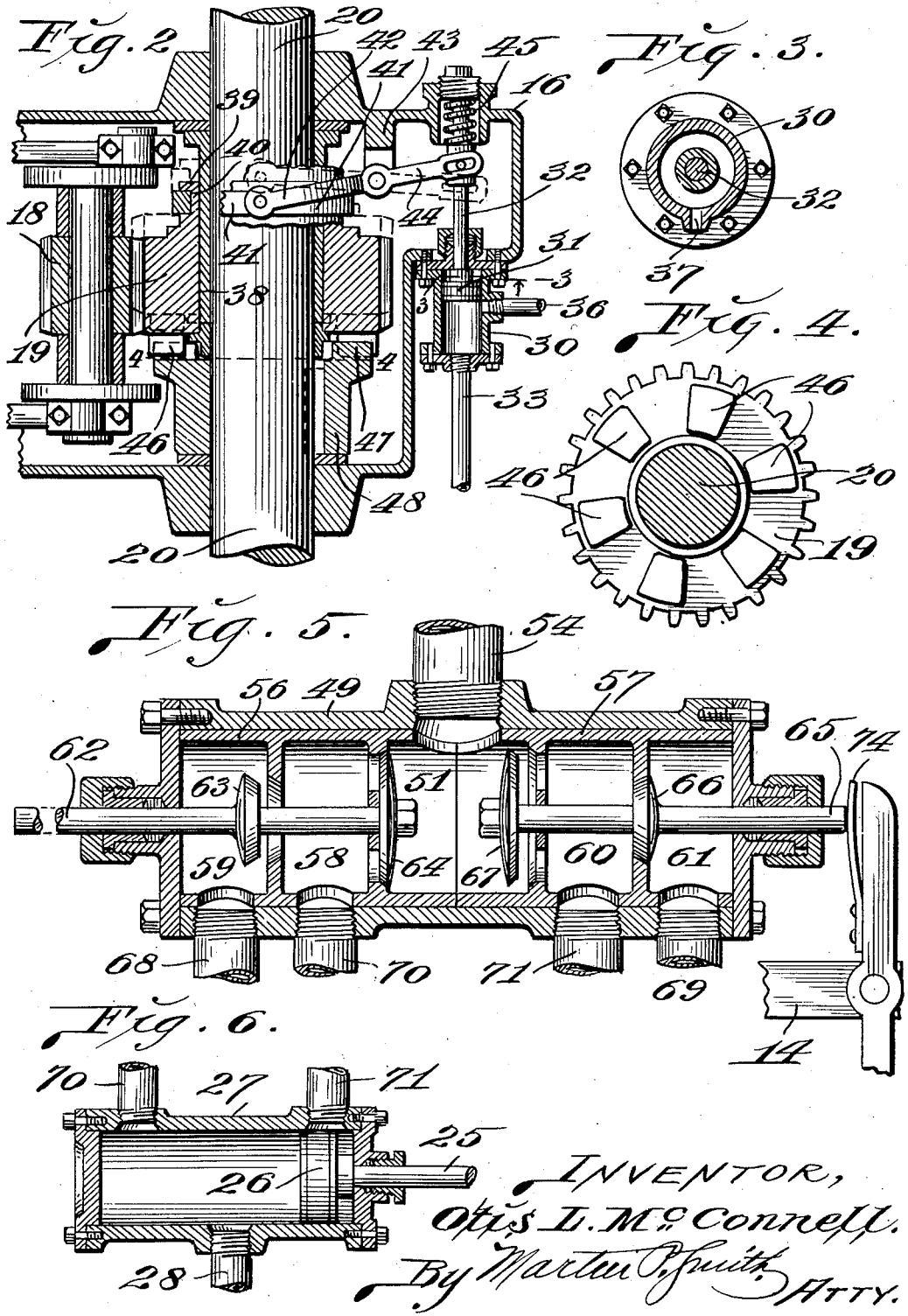

Patented May 25, 1926.

1,586,453

UNITED STATES PATENT OFFICE.

OTIS L. McCONNELL, OF LOS ANGELES, CALIFORNIA.

LOCOMOTIVE BOOSTER-MOTOR CONTROL.

Application filed September 18, 1924. Serial No. 738,498.

My invention relates generally to booster motors for locomotives, and more particularly to mechanism for controlling the operation of the booster or auxiliary motor, which latter, it will be understood, is utilized for the trailer truck of a locomotive as an aid in starting the locomotive, and while the same is pulling relatively heavy loads at low speed or on grades.

The principal objects of my invention are to generally improve upon and simplify the construction of the existing forms of booster motor controlling mechanisms; to provide a control mechanism that cooperates readily with the reach rod of the locomotive and its actuating lever; to provide a control mechanism that will be effective in effecting a driving engagement or disengagement between the booster motor and the locomotive axle with which it is associated while the locomotive is in motion; and, further, to provide a booster motor control mechanism of the character referred to that is relatively simple in structure, capable of being readily installed, and which will be very effective in performing its intended functions.

With the foregoing and other objects in view, my invention consists in the features of construction and combination and arrangement of parts hereinafter more fully described and claimed, reference being had to the accompanying drawings, in which:

Figure 1 is a diagrammatic side elevational view of the rear portion of a locomotive boiler and the booster motor that is associated with the trailer truck of said locomotive and showing my improved control mechanism associated with said locomotive and booster motor;

Figure 2 is an enlarged horizontal section taken on the line 2—2 of Figure 1;

Figure 3 is an enlarged cross section taken on the line 3—3 of Figure 2;

Figure 4 is a sectional view taken on the line 4—4 of Figure 2;

Figure 5 is an enlarged vertical section taken lengthwise through the center of a valve forming a part of the control mechanism and which is used for controlling the flow of steam to the cylinder that actuates the booster motor reversing mechanism;

Figure 6 is an enlarged vertical section taken lengthwise through the center of the cylinder and the piston that are utilized for actuating the booster motor reversing mechanism.

Referring by numerals to the accompanying drawings, which illustrate a practical embodiment of my invention, 10 designates the boiler of the locomotive, 11 the steam dome thereof, 12 the dry steam pipe that leads from the steam dome to the steam chest associated with the main cylinders of the locomotive, and 13 the usual throttle valve that is associated with the steam pipe 12. Associated with the locomotive is a usual reach rod 14 that is actuated by means of lever 15, and associated with the trailer truck of the locomotive is the booster motor that includes a housing 16 and booster motor cylinders 17. The pistons within the booster motor cylinders are arranged to drive by conventional means a small gear wheel 18, the shaft of which is journaled in suitable bearings, and said gear wheel is constantly in mesh with a larger gear wheel 19 that is loosely mounted on the trailer truck axle 20.

Leading from the steam chest of the main cylinders of the locomotive to the valve chamber of the booster motor cylinders is a steam supply pipe 21, in which is located the usual booster motor throttle valve 22, and leading from the booster motor cylinders 17 to the exhaust nozzle of the locomotive is an exhaust pipe 23. Connected to a part 24 of the booster motor reversing mechanism is one end of a rod 25, the outer end of which carries a piston 26 that is arranged for operation within a relatively small cylinder 27. Leading from the central portion of this cylinder 27 downwardly to the valve chamber of the booster motor cylinders 17 is a pipe 28 in which is located a combined choke and check valve 29. This combined valve is arranged so as to admit a predetermined amount of steam to the valve chamber of the booster motor cylinders and to cut off the passage of steam from said cylinders back to cylinder 27.

Located on the forward portion of the booster motor gear housing 16 is a cylinder 30 within which is arranged for operation a piston 31 that is carried by a piston rod 32, the latter extending into the booster motor gear housing, and leading from pipe 28 to the outer end of cylinder 30 is a pipe 33 in which is located a choke valve 39' and a manually operable globe valve 35. Leading from the intermediate portion of cylinder 30 to the booster motor valve 22 is a pipe 36, and formed in the lower portion of the forward end of cylinder 30 or the end that is adjacent to the housing 16 is a drain opening 37.

Gear wheel 19 is arranged for sliding movement upon a bushing or sleeve 38 that is carried by trailer truck axle 20, and said gear wheel is provided with a hub portion 39 in which is formed a groove 40 that receives a loosely mounted ring 41. This ring is engaged by the arms of a yoke 42, the latter being fulcrumed on a lug or bracket 43 that projects inwardly from the adjacent wall of housing 16, and the outer end of an arm or lever 44 that is associated with said yoke has a pin-and-slot connection with piston rod 32. Associated with rod 32 is a compression spring 45 that tends to normally force said rod outwardly toward the cylinder 30 so as to position piston 31 between the pipe connections 33 and 36. Formed on the side of gear wheel 19 opposite from hub 39 is a series of lugs 46 that provide a clutch face, and said lugs are adapted to engage between corresponding lugs 47 that are formed on the side of a collar 48, which latter is rigidly fixed in any suitable manner to trailer truck axle 20.

Under normal conditions, or while spring 45 is expanded, the connections, including yoke 42 and ring 41, move gear wheel 19 upon sleeve or bushing 38 so that the clutch face comprising lugs 46 is wholly disengaged from the clutch face comprising lugs 47 on collar 48, and under such conditions the booster motor is "cut out" or disentrained from the trailer truck axle.

The means for controlling the delivery of steam to cylinder 27 that is effective in actuating the booster motor reversing mechanism includes a valve cylinder 49 that is located adjacent to reach rod 14, and leading from the usual fountain 50 that is located on the upper portion of the locomotive boiler to a centrally arranged chamber 51 within said cylinder is a pipe 52 in which is located a manually operable globe valve 53. Leading from pipe 52 to steam pipe 12 and connecting with the latter at a point just below throttle 13 is a pipe 54 in which is located a manually operable globe valve 55.

Located within cylinder 49 are lining sleeves 56 and 57 that are duplicates in size, form and construction, and formed in lining 56 are chambers 58 and 59. Corresponding chambers 60 and 61 are formed in lining 57. Arranged for sliding movement through lining 56 and the corresponding end of cylinder 49 is an axially disposed rod 62 that carries valves 63 and 64, said valve 63 controlling an opening between chambers 58 and 59, and valve 64 controlling an opening between chambers 51 and 58. These valves 63 and 64 are spaced so that when one valve is seated so as to close its opening the other valve is unseated or in open position.

Arranged for sliding movement through lining 57 and the corresponding end of cylinder 49 is an axially disposed rod 65 that carries valves 66 and 67. Valve 66 controls an opening between chambers 60 and 61, and valve 67 controls an opening between chambers 51 and 60.

Leading from chambers 59 and 61 are exhaust pipes 68 and 69, respectively, and leading from chamber 58 to one end of cylinder 27 is a pipe 70. A similar pipe 71 leads from chamber 60 to the opposite end of cylinder 27.

Pivotally mounted on reach rod 14 and suitably spaced apart are dogs 72 and 73, each being provided on its inner face with a resilient cushioning finger such as 74 that is adapted to contact with the corresponding valve rod, and pivotally connected to dog 72 at a point above the point where the same is pivotally connected to the reach rod and to the lower end of dog 73 is a rod or link 75. A dog actuating lever 76 is fulcrumed on reach rod actuating lever 15, the axes of the two levers being coincident, and connecting the lower end of said lever 76 with dog 72 and connecting thereto at the point of pivotal connection of rod or link 75 is a rod or link 77. The quadrant for lever 76 is secured to and carried by lever 15.

It will be understood that when lever 76 occupies a vertical position, as illustrated in Figure 1, the connections between said lever and the dogs 72 and 73 are such as to maintain said dogs in substantially vertical parallel positions so that either one may engage and move inwardly the corresponding valve carrying rod 62 or 65, depending, of course, on the position of reach rod actuating lever 15. When lever 76 is shifted into a position as shown by dotted lines in Figure 1, then the dogs 72 and 73 will be shifted into angular positions, as shown by dotted lines in Figure 1, so that they will not make contact with the valve carrying rods.

Under normal conditions, or while the booster motor is cut out or disentrained, lever 76 is positioned so as to retain dogs 72 and 73 in their angular positions, as shown by dotted lines in Figure 1, so that neither of said dogs engages with its corresponding valve rod. Consequently, steam pressure from steam pipe 12 passes through pipe 54 into intermediate chamber 51, thereby maintaining valves 64 and 67 on their seats in closed position with valves 63 and 66 unseated or in open positions, and while said valves are in these positions chamber 58 is in communication with chamber 59 and chamber 60 is in communication with chamber 61, thereby permitting any pressure that might otherwise be trapped in the system to exhaust freely through pipes 68 and 69. Inasmuch as there is no pressure behind piston 31 in cylinder 30, spring 45 in its expanded condition will position yoke 42 and gear wheel 19 so that the clutch face on the latter is out of engagement with the clutch face on collar 48.

To engage or entrain the booster motor with the trailer truck axle, lever 76 is actuated so as to shift dogs 72 and 73 into vertical positions, and assuming that the booster motor is to be entrained as the locomotive is moving forwardly, dog 73 will, as reach rod actuating lever 15 is shifted so as to move the main valve of the locomotive to full stroke position, be positioned so as to engage valve rod 65 and move the same inward a sufficient distance to unseat valve 67 and close valve 66.

Following this action, steam pressure that enters chamber 51 through pipe 54 will pass into chamber 60, thence through pipe 71 to cylinder 27, thereby moving piston 26 into the end of said cylinder to which pipe 70 is connected, and, consequently, establishing communication between pipes 71 and 28. A certain amount of the steam pressure thus passing through cylinder 27 and pipe 28 will pass through choke valve 29, thereby causing the pistons within the booster motor cylinders 17 to slowly actuate the connections to the shaft that carries pinion 18. Immediately following, or practically coincident with this starting of the booster motor the steam pressure passing through pipe 33 will enter cylinder 30 and force piston 31 lengthwise therethrough against the resistance offered by spring 45, so that when the full degree of steam pressure prevails within the cylinder 30, rod 32 will have been moved into position so that its clutch face comprising the lugs 46 engages the coresponding clutch face on collar 48. When piston 31 has been thus moved to the inner end of cylinder 30, communication to pipe 36 is established, thus admitting steam pressure to booster throttle 22, and, consequently, opening communication through pipe 21 which leads from the steam chest of the main cylinders of the locomotive to the valve chamber of the booster motor cylinders 17. Thus the booster motor cylinders are supplied with steam pressure directly from the steam chest of the main cylinders of the locomotive, and as long as the valve 67 is maintained in its open position this condition prevails and the booster motor, through gears 18 and 19, will impart driving power to the trailer truck axle 20, thereby materially assisting the locomotive while the latter is starting or while pulling heavy loads at relatively low speeds.

To cut out the booster motor, it is only necessary to shift lever 76 into the angular position shown by dotted lines in Figure 1, which operation shifts the dogs 72 and 73 into angular positions so that neither dog may contact with its respective valve rod, and following this action the steam pressure prevailing within chamber 51 will seat valve 67 and at the same time unseat valve 66, thereupon permitting the steam pressure within the pipes to exhaust through pipes 71 and 69, and as pressure upon piston 31 is relieved spring 45 will act to return said piston and rod 32 to their normal positions. thereby acting to cut off the flow of steam to pipe 36 that leads to the booster throttle, which latter operates in the usual manner to cut off the passage of steam from the steam chest of the main cylinders of the locomotive through pipe 21 to the booster engine cylinders 17. Obviously, as rod 32 returns to its normal position yoke 42 will be swung upon its fulcrum, thereby shifting gear wheel 19 on its sleeve and disengaging the clutch face on said gear wheel from the clutch face on collar 48.

Practically the same operations as just described take place when reach rod 14 is actuated by means of lever 15 to reverse the locomotive, but in such event dog 72 is shifted into position to actuate rod 62 so as to unseat valve 64 and seat valve 63, and when this is done steam pressure from chamber 51 will pass into chamber 58, thence through pipe 70 to the outer end of cylinder 27, and as a result piston 26 is moved to the end of said cylinder 27 so as to establish communication between pipes 70 and 28, and as the piston is thus moved rod 25 will be shifted so as to correspondingly actuate the reversing mechanism forming a part of the booster motor. Thus the boster motor will be reversed to correspond with the reverse action imparted to the main driving wheels of the locomotive.

In the event that it is desired to operate the booster motor when the same is undergoing adjustments or repairs, valve 55 is closed and by opening valve 53 and closing cut out valve 35 a sufficient amount of steam to operate the said booster motor may be taken from fountain 50 through pipe 52.

Thus it will be seen that I have provided relatively simple and efficient means for controlling the operation of a booster motor for locomotives which controlling means readily cooperates with the standard arrangements of the locomotives and booster motors now in general use. The entire apparatus is under control of a single manually operable lever, which latter may be actuated entirely independently of the locomotive control lever, and thus the booster motor may be put into or out of action while the locomotive is in motion and especially while traveling at relatively low speeds.

It will be understood that various changes may be made in my improved booster motor controlling mechanism without departing from the spirit of my invention, the scope of which is set forth in the appended claims.

I claim as my invention:

1. The combination with a locomotive, its reach rod, its booster motor and the booster motor reversing mechanism, of fluid pressure actuated means for actuating and controlling the position of the booster motor reversing mechanism, means including a pair of double valves for controlling the supply of fluid pressure to said fluid pressure actuated reversing mechanism actuating means and manually operable means carried by the reach rod of the locomotive for actuating and controlling the positions of said double valves.

2. The combination, with a locomotive, its booster motor and the driving axle with which said booster motor is associated, of a gear wheel loosely arranged on said driving axle, which gear wheel is constantly in mesh with a gear wheel that is driven by said booster motor, said loosely mounted gear wheel having a clutch face that is adapted to engage with the clutch face on a member that is fixed to the driving axle with which the booster motor is associated, and fluid pressure actuated means for moving said gear wheel so as to cause its clutch face to engage with or disengage from the clutch face on the member that is fixed to said driving axle.

3. The combination, with a locomotive, its booster motor and the driving axle with which said booster motor is associated, of a gear wheel loosely arranged on said driving axle, which gear wheel is constantly in mesh with a gear wheel that is driven by said booster motor, said loosely mounted gear wheel having a clutch face that is adapted to engage with the clutch face on a member that is fixed to the driving axle with which the booster motor is associated, fluid pressure actuated means for moving said gear wheel so as to cause its clutch face to engage with or disengage from the clutch face on the member that is fixed to said driving axle, and manually controlled fluid pressure actuated means for controlling the operation of said first mentioned fluid pressure actuated means.

4. The combination, with a booster motor for locomotives and the driving axle with which said booster motor is associated, of a gear wheel mounted for sliding movement upon said driving axle, said gear wheel having a clutch face, a member secured to said driving axle and having a clutch face with which the clutch face on the gear wheel is adapted to engage, a booster motor driven gear wheel that is constantly in mesh with the sliding gear wheel, and manually controlled fluid pressure actuating means for moving said gear wheel on the driving shaft so that its clutch face engages the clutch face on the member that is fixed to the driving shaft, and yielding pressure means associated with said fluid pressure actuated means for shifting said gear wheel so as to disengage the clutch face thereof from the clutch face on said fixed member.

5. The combination, with a locomotive, its booster motor and the booster motor reversing mechanism, of fluid pressure actuated means for actuating and controlling the position of the booster motor reversing mechanism, and means including a pair of double valves for controlling the supply of fluid pressure to said fluid pressure actuated reversing mechanism actuating means.

6. The combination, with a locomotive, its booster motor and the booster motor reversing mechanism, of fluid pressure actuated means for actuating and controlling the position of the booster motor reversing mechanism, means including a pair of double valves for controlling the supply of fluid pressure to said fluid pressure actuated reversing mechanism actuating means, and manually operable means for controlling the positions of said double valves.

In testimony whereof I affix my signature.

OTIS L. McCONNELL.